US009707949B2

United States Patent
Charpentier et al.

(10) Patent No.: US 9,707,949 B2
(45) Date of Patent: Jul. 18, 2017

(54) ELECTROHYDRAULIC SERVO BRAKE

(71) Applicant: Robert Bosch GmbH, Stuttgart (DE)

(72) Inventors: Carole Charpentier, Montmorency (FR); Antony Auguste, Villiees/Marne (FR); Bastien Cagnac, Cramoisy (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/888,662

(22) PCT Filed: May 2, 2014

(86) PCT No.: PCT/EP2014/058995
§ 371 (c)(1),
(2) Date: Nov. 2, 2015

(87) PCT Pub. No.: WO2014/177698
PCT Pub. Date: Nov. 6, 2014

(65) Prior Publication Data
US 2016/0101767 A1   Apr. 14, 2016

(30) Foreign Application Priority Data

May 3, 2013   (FR) ..................................... 13 54079

(51) Int. Cl.
*B60T 13/74*   (2006.01)
*B60T 7/04*   (2006.01)

(52) U.S. Cl.
CPC ............ *B60T 13/745* (2013.01); *B60T 7/042* (2013.01)

(58) Field of Classification Search
CPC ......... B60T 13/745; B60T 13/02; B60T 7/042
(Continued)

(56) References Cited

U.S. PATENT DOCUMENTS 5,971,500 A * 10/1999 Voges ..................... B60T 7/042
188/356
2004/0094027 A1 * 5/2004 Bacardit ............... B60T 13/575
91/369.2

(Continued)

FOREIGN PATENT DOCUMENTS

DE    10 2010 043 203 A1   5/2012
WO        2012/059260 A1   5/2012
WO        2012/080157 A1   6/2012

OTHER PUBLICATIONS

International Search Report corresponding to PCT Application No. PCT/EP2014/058995, mailed Jun. 26, 2014 (German and English language document) (5 pages).

*Primary Examiner* — Thomas J Williams
(74) *Attorney, Agent, or Firm* — Maginot, Moore & Beck LLP

(57) ABSTRACT

An electrohydraulic servo brake includes a master brake cylinder, which is controlled by a push rod. The push rod is configured to be actuated by a first auxiliary piston via a reaction disk. A plunger piston presses on the reaction disk. An end of the push rod is connected to the first auxiliary piston by a connection apparatus. The connection apparatus includes a rest for a rated compression spring, which rest is rigidly connected to the push rod, and a central piston, which rests against the reaction disk along an axis and is surrounded by a second auxiliary piston, which is placed against the reaction disk and is moved by the spring and is held in an end position by the central piston. The second auxiliary piston is configured to recede in relation to the central piston rigidly connected to the push rod.

5 Claims, 3 Drawing Sheets

(58) Field of Classification Search
USPC .................................................. 303/114.3
See application file for complete search history.

(56) References Cited

U.S. PATENT DOCUMENTS

| | | | | |
|---|---|---|---|---|
| 2013/0047593 A1* | 2/2013 | Weiberle | ................... | B60T 1/10 |
| | | | | 60/327 |
| 2013/0221737 A1* | 8/2013 | Richard | ................ | B60T 8/4077 |
| | | | | 303/119.1 |
| 2014/0319902 A1* | 10/2014 | Benzler | ................ | B60T 13/586 |
| | | | | 303/6.01 |

* cited by examiner

ELECTROHYDRAULIC SERVO BRAKE

This application is a 35 U.S.C. §371 National Stage Application of PCT/EP2014/058995, filed on May 2, 2014, which claims the benefit of priority to Serial No. FR 1354079, filed on May 3, 2013 in France, the disclosures of which are incorporated herein by reference in their entirety.

The present disclosure relates to an electrohydraulic servo brake which has a main brake cylinder which is controlled by the push rod which is actuated by the auxiliary piston by means of the reaction disc, wherein there extends through the auxiliary piston itself a plunger piston which presses on a portion of the reaction disc by being connected to the control rod which is itself connected to the brake pedal, and a detector which detects the movement of the control rod in order to actuate the electric motor of the servo brake, which electric motor drives the auxiliary piston.

BACKGROUND

Such an electrohydraulic servo brake is known according to the general prior art. However, with such a servo brake, when the ABS system is actuated, the modulation sends a specific quantity of brake fluid into the main brake cylinder. This becomes evident as a backward movement of the brake pedal, together with weak pressure peaks in the main brake cylinder. These pressure fluctuations are in the order of magnitude of ±30 bar. As a result of the mechanical structure thereof, however, the servo brake with electric motor is a rigid transmission system which does not move backward spontaneously under the action of such loads. This results in an increase of the amplitude of the pressure peaks during this maneuver. This increase may exceed 100 bar so that the transmission of the servo brake is subjected to great fatigue at the expense of the reliability thereof.

SUMMARY

An object of the present disclosure is to develop an electrohydraulic servo brake whose pressure peaks produced during the use of the ABS system are reduced in order to reduce the forces applied to the transmission of the servo brake.

To this end, the present disclosure relates to a servo brake of the type defined above, characterized in that the end of the push rod is connected to the auxiliary piston by means of a connection which contains:
a support which is securely connected to the push rod for a tared pressure spring,
a central piston in abutment in accordance with the axis against the reaction disc,
an auxiliary piston which surrounds the central piston by being placed against the reaction disc in a state pushed by the tared spring and retained in the end position by the central piston, wherein the auxiliary piston can move backward with respect to the central piston which is securely connected to the push rod.

According to the disclosure, the pushing action of the tared spring corresponds to a pressure in the main brake cylinder. Advantageously, this pressure is fixed at 130 bar so that below this pressure in the main brake cylinder the servo brake operates normally: the auxiliary piston pushes the push rod by means of the reaction disc without the reaction disc becoming deformed with respect to the central piston and the auxiliary piston which are carried by the end of the push rod.

However, if the pressure in the main brake cylinder exceeds this desired pressure which is fixed at 130 bar in this instance, which corresponds to the taring of the pressure spring of the connection portion, the auxiliary piston gives way to the pushing action of the pressure spring so that the reaction applied to the auxiliary piston by the main brake cylinder and the translation thereof (toothed rod, toothed pinion, etc.) is reduced, whilst the pushing action transmitted by the central piston to the plunger piston and to the push rod and then to the brake pedal is increased.

This change of the distribution of the loads applied in return by the main brake cylinder to the servo brake improves the operation of the servo brake and reduces the loading connected with the pressure peaks and consequently the fatigue of the transmission, which becomes evident generally as improved efficiency and longer service-life of the transmission.

In the region of this desired pressure which corresponds to the tared reaction of the spring, the amplification ratio of the servo brake is changed: it is reduced beyond this critical pressure which, as already stated, reduces the loads applied to the translation and increases the load applied to the brake pedal and consequently the foot of the driver.

According to an advantageous feature, the auxiliary piston is in the form of a crown having a shoulder in order to be engaged on the central piston and, by means of the forward movement thereof, to be driven in the direction of the pushing action of the push rod, whilst it can at the same time move forward with respect to the central piston by the spring being compressed.

This embodiment has the advantage of being mechanically very simple and nonetheless protecting the reaction disc in order to prevent excessive displacement since this is limited by the displacement travel of the auxiliary piston.

According to another feature, the forward movement of the annular auxiliary piston, which is fitted on the end of the push rod, relative to the push rod is limited by a stop.

According to another feature, the pressure spring is tared for a desired pressure in the main brake cylinder, and this pressure is in particular fixed at 130 bar.

The cylindrical portion which is a simple component or which is a simple form of the push rod has the dual function of guiding and protecting the pressure spring in order to prevent any deflection and, on the other hand, it protects the spring from compression by the reaction disc also thereby being protected from any excessive deformation, which can lead to the central piston beginning to press through the front side of the reaction disc.

According to another advantageous feature, the limit pressure which is determined for the desired pressure is 130 bar.

The servo brake according to the disclosure has the advantage of taking over a large number of elements of known servo brakes so that the integration thereof in a production or assembly chain does not present any particular difficulty and does not lead to additional costs.

BRIEF DESCRIPTION OF THE DRAWINGS

The present disclosure is described in greater detail below with reference to an embodiment, which is illustrated schematically in the drawings, in which:

FIG. 2A shows the connection in the lower pushing position when the pushing action is below the tared force, FIG. 2B is a view similar to that of FIG. 2A of the connection between the auxiliary piston and the push rod in the position which has exceeded the tared pushing action.

DETAILED DESCRIPTION

Figure 1:
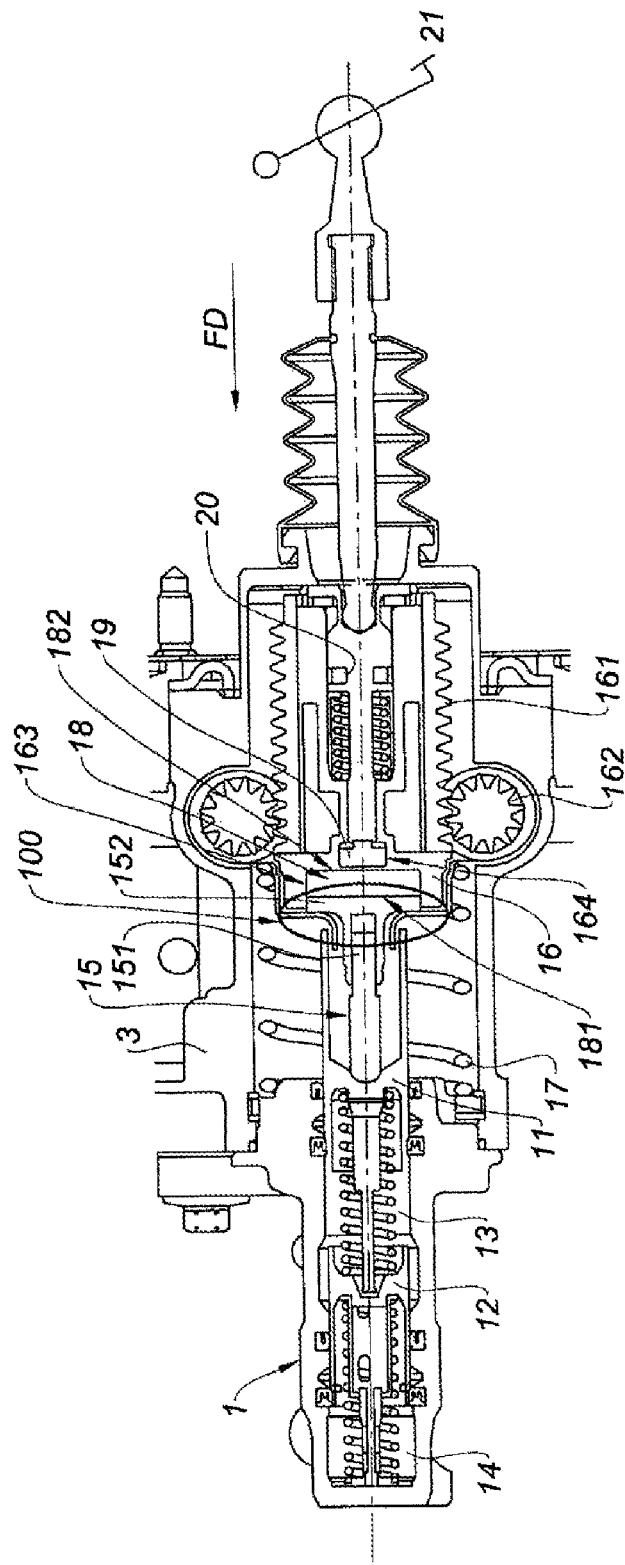
FIG. 1 is an axial section of an electrohydraulic servo brake.

FIG. 1 is a general diagram of an electrohydraulic servo brake comprising a main brake cylinder 1 (in this instance, a tandem main brake cylinder) which has a primary piston 11 and a secondary piston 12 which delimit a primary chamber 13 and a secondary chamber 14 which are both supplied with hydraulic fluid from a brake fluid container which cannot be seen in FIG. 1 and which is connected to the primary chamber 13 and to the secondary chamber 14. The hydraulic fluid which is placed under pressure in these chambers supplies two brake circuits which are also not illustrated.

The main brake cylinder 1 is controlled on the basis of the primary piston 11 which itself is actuated by a push rod 15 which is accommodated for a large part in the primary piston and whose end 151 cooperates with the auxiliary piston 16 of the electromechanical portion of the servo brake in the opposite direction to the end in abutment with the primary piston 11 by means of a thrust piston 152. The auxiliary piston 16 has two toothed rods 161 symmetrically in the plane section. These toothed rods 161 cooperate with toothed wheels 162 which rotate synchronously in opposing directions by being driven by means of a motor which is not illustrated. The toothed wheels 162 are incorporated in the body 3 of the electromechanical portion of the servo brake. The auxiliary piston 16 is pushed back by a restoring spring 17 into the rest position which surrounds the rear portion of the main piston 11 along the movement axis XX.

The auxiliary piston 16 transmits its pushing action to the thrust piston 152 of the push rod 15 by means of the interposition of a reaction disc 18 whose front side 181 (side at the side of the main brake cylinder) is in abutment against the auxiliary piston 151 and whose rear side 182 (at the side of the brake pedal) is in abutment with the base of the receiving member 163 which is formed by the auxiliary piston 16. The auxiliary piston 16 is open at the center thereof about the axis XX and forms the guiding passage 164 of a plunger piston 19 which also moves into abutment against the rear side 182 of the reaction disc 18. The plunger piston 19 is connected to the control rod 20 which itself is connected to the brake pedal 21. The details of the control rod 20 and the different devices such as the movement sensors, in order to detect the braking requirement and to evaluate this information, are in this instance known devices which are not described in detail.

The electrohydraulic servo brake is controlled when the brake pedal 21 is actuated from the displacement movement of the control rod 20 (arrow $F_D$) which is placed by means of the plunger piston 19 on the reaction disc 18. The movement thereof is detected by a movement sensor which is not illustrated in order to actuate the electric motor of the servo brake in order to drive the pinions 162 which move the auxiliary piston 16 forward by means of the toothed rods 161. The auxiliary piston 16 applies a pushing action against the reaction disc 18 which itself pushes the thrust piston 152 of the push rod 15 in order to push the primary piston 11 and, by means of the fluid compressed in the primary chamber 13, the secondary piston 12 of the tandem main brake cylinder 1.

In the servo brake according to the prior art, the connection between the push rod 15 and the reaction disc 18 (front side 181) is produced by means of the thrust piston 152, which is mounted so as to be able to be adjusted on the push rod 15, but which is securely connected to the push rod in the translation direction when the adjustment was carried out (adjustment by means of screwing) so that the entire front side 181 of the reaction disc 18 rests on the piston 152 of the push rod 15; this piston 152 is itself introduced into the opening of the receiving member 163 which receives the reaction disc 18 in the auxiliary piston 16.

Figure 2A:
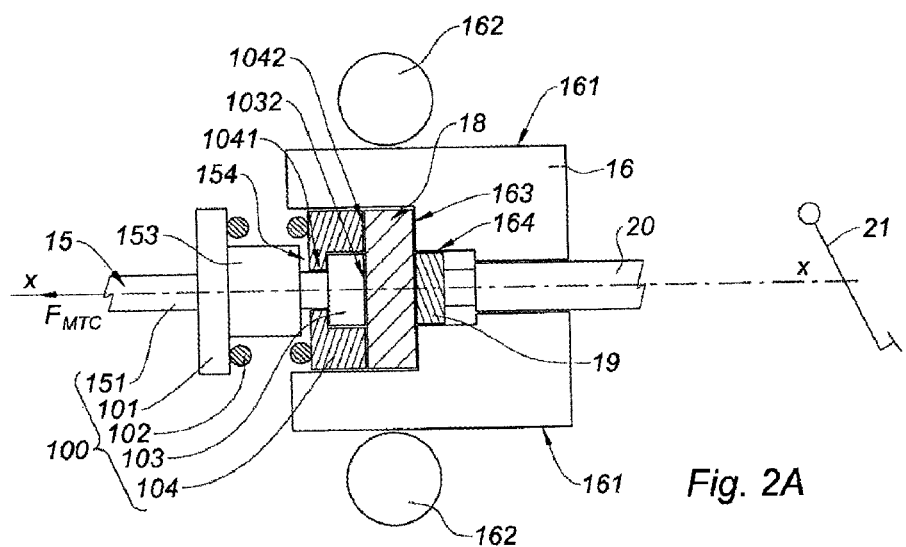
FIGS. 2A-2B schematically show the connection between the auxiliary piston and the push rod of the electrohydraulic servo brake according to the disclosure.
Figure 2B:
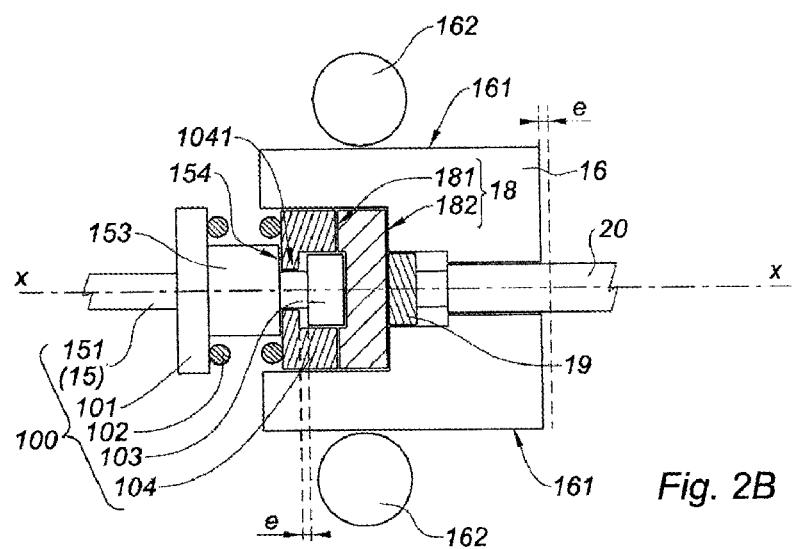

The electrohydraulic servo brake according to the disclosure differs from this known electrohydraulic servo brake as a result of the connection portion 100 between the push rod 15 and the actuation piston 16. This connection portion 100 which is surrounded in FIG. 1 by an ellipse comprises according to the disclosure a connection portion 100, a connection which is schematically illustrated in FIGS. 2A and 2B.

Conventionally, the front side or "forward direction" is the direction toward the main brake cylinder. The rear side or "rear direction" is the direction toward the brake pedal.

The connection portion 100 thus has between the rear end of the push rod 15 and the reaction disc 18 a support 101 in the form of a disc or a crown which is securely connected to the rod 15 and which receives a pressure spring 102 which develops a tared force which corresponds to a desired pressure $P_C$ which is present in the main brake cylinder. This desired pressure is, for example, a pressure of 130 bar. This pressure is evident as a reaction force which is dependent on the geometry of the servo brake and which defines the force to which the pressure spring 102 is tared. As will be seen below, the structure of the connection portion 100 is configured in such a manner that the pressure spring 102 withstands a load which is smaller than or equal to this tared force and it gives way from the time at which it is subjected to a force which is equal to or greater than this tared force.

Under these conditions and, as a result of the use of incorrect terminology, the desired pressure in the main brake cylinder, as a result of the use of incorrect terminology, has become synonymous with the reaction force in the connection portion, a force for which the connection portion 100 changes its operating type, that is to say, its amplification mode of the servo brake.

The end 151 of the push rod 15 continues in the form of a main piston 103 around the axis XX. This main piston 103 carries an auxiliary piston 104 in the form of an annular crown, provided with a shoulder 1041 around the central opening thereof, in order to be assembled on the end 151 of the push rod 15 upstream of the main piston 103. This auxiliary piston 104 is pushed by the pressure spring 102 in order to normally be held in abutment against the main piston 103. In this support position, the front side 1042 of the auxiliary piston 104 and the side 1032 of the central piston 103 are in the same plane, in a state placed against the front side 181 of the reaction disc 18.

The end 151 carries a cylindrical portion 153 having a large diameter in order to accommodate the volume in the pressure spring 102 and to support it. This cylindrical portion 153 also forms a front stop 154 for the auxiliary piston 104 and limits the forward movement thereof in the pushing direction ($F_{MTC}$). As can be seen in FIGS. 2A, 2B, the auxiliary piston 104 can thus be moved relative to the end 151 of the push rod 15 (and the central piston 103) between the end position thereof toward the right according to FIG. 2A, in a state pushed by the spring 102 and in abutment against the central piston 103, and the other end position toward the left (FIG. 2B). The displacement range (e) of the auxiliary piston 104 is limited in order to prevent excessive deformation of the reaction disc 18, which comprises a resilient material which is deformable, but not compressible (that is to say, without volume change).

The other side 182 (rear side) of the reaction disc 18 is in abutment with the base of the receiving member 163 in the auxiliary piston 16 on a face which is in the form of a support crown and which is centered about the axis XX. At the center thereof about the axis XX, the auxiliary piston 16 forms a guiding passage 164 through which the control rod 20 extends and which receives the plunger piston 19 at the front end of the control rod 20. The plunger piston 19 moves into abutment against the rear side 182 of the reaction disc 18 and against the support crown of the auxiliary piston 16. At the beginning of a brake actuation, as long as the pushing action which is applied by the control rod 20 and in particular the auxiliary piston 16 to the reaction disc 18, which itself moves against the auxiliary piston 104 and the main piston 103, is smaller than the pushing action $P_C$, to which the spring 102 is tared, the load is transmitted to the push rod 15 which itself actuates the main brake cylinder as mentioned above. During this actuation, the side of the central piston 103 and that of the auxiliary piston 104 abut the front side 181 of the reaction disc 18 which remains planar. The pushing action is transmitted to the rod 15 by the central piston 103 and the auxiliary piston 104 and the spring 102 thereof, which is not compressed since the load applied to the pedal 21 and the control rod 20 is lower than the tared reaction of the spring 102.

However, as soon as the load applied exceeds the tared pushing action $P_C$, the spring 102 no longer holds back the auxiliary piston 104 which gives way backward and enables the reaction disc 18 to "creep" around the main piston 103 (FIG. 2B), so that the reaction applied to the control rod 20 increases more than provided for by the amplification coefficient of the servo brake. In this instance (FIG. 2B), the proportion of the load transmitted by the control rod 20 in the overall load increases and the proportion of the auxiliary piston 16 decreases. The deformation of the reaction disc 18 is in principle limited by the auxiliary piston 104 moving into abutment against the cylindrical portion 153 in order not to damage the reaction disc 18 by a pushing-through action, which the central piston 103 could produce, being initiated.

Figure 3:
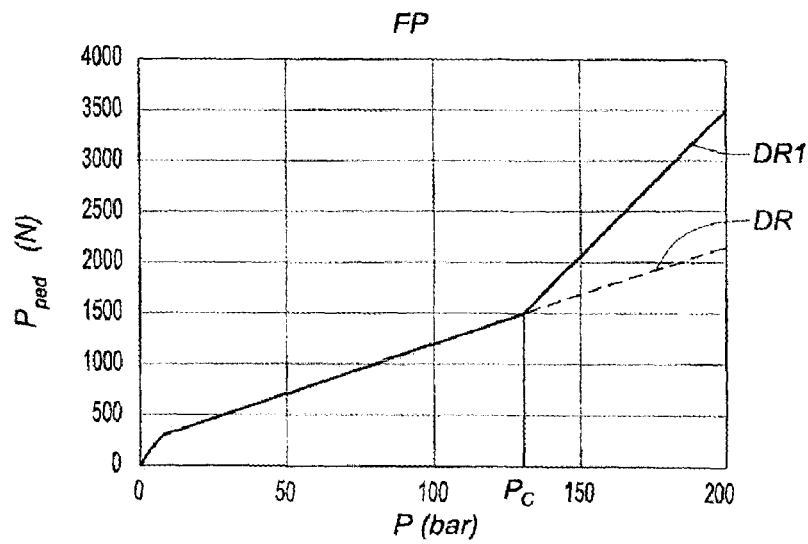
FIG. 3 is a graph which sets out the force at the brake pedal and emphasizes the development of this force below and above the tared pushing action.
Figure 4:
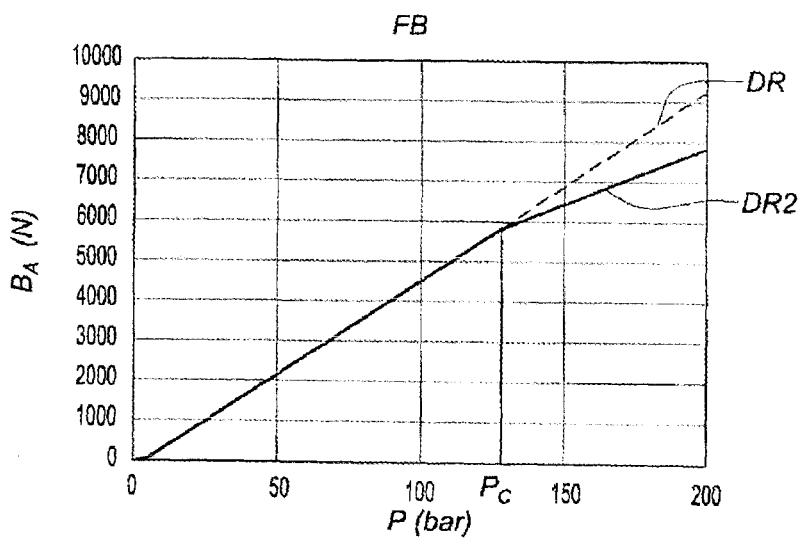
FIG. 4 is a graph similar to that of FIG. 3 which sets out the reaction force which is applied to the control rod before and after the tared pushing action.

FIGS. 3 and 4 show the transmission of the pushing action from the reaction disc 18 below and above the pushing action in accordance with the tared reaction of the pressure spring 102. In the graphs, this pushing action is associated with the desired pressure $P_C$ which is present in the main brake cylinder 1 and which is fixed at 130 bar.

FIG. 3 shows the reaction $R_{ped}$ which is applied to the pedal 21 in accordance with the pressure P (force $P_{ped}$) in the main brake cylinder 1, which corresponds to the straight line DR which represents the linear relationship between the force applied to the pedal (or the reaction applied by the servo brake to the pedal) in accordance with the pressure in the reaction disc.

The graph of FIG. 4 illustrates the amplification straight line DR which connects the pushing load $B_A$ applied by the electromechanical servo brake, that is to say, the load applied by the auxiliary piston 16 whose forward movement is controlled by the electric motor with interposition of the toothed pinions 162 and the two toothed rods 161 in accordance with the pressure P to which the reaction disc is subjected.

In the two graphs, the desired pressure $P_C$ below the load corresponding to the desired pressure $P_C$ is emphasized, in practice the relationship corresponds to the linear relationship which represents the amplification coefficient of the servo brake, but from this desired pressure the amplification coefficient for each additional load requested by the brake system no longer follows the linear relationship of the straight line DR, but instead changes to a straight line segment $DR_1$, $DR_2$ with another gradient.

After passing through the desired pressure $P_C$, the straight line segment $DR_2$, on which the force of the amplifier develops, is located below the straight line DR which corresponds to an amplification coefficient which is reduced from the pressure point $P_C$.

In contrast, the complement of the pushing action is provided by the actuation of the pedal whose reaction $R_{ped}$ (FIG. 3) develops in accordance with the straight line segment $DR_1$ over the segment DR. That is to say, the reaction which is transmitted back to the pedal 21 increases whilst the force applied by the auxiliary piston 16 and consequently by the electromechanical servo brake decreases with respect to this linear line DR.

The invention claimed is:

1. An electrohydraulic servo brake comprising:
   a first auxiliary piston;
   an electric motor configured to drive the first auxiliary piston;
   a reaction disc;
   a push rod including an end portion connected to the first auxiliary piston by a connection apparatus including (i) a support fixedly connected to the push rod and operatively connected to a tared pressure spring, (ii) a central piston in abutment with the reaction disc and fixedly connected to the push rod, and (iii) a second auxiliary piston configured to surround the central piston by being placed against the reaction disc in a state pushed by the tared pressure spring and retained in an end position by the central piston, and the second auxiliary piston configured to move backward with respect to the central piston;
   a main brake cylinder controlled by the push rod and configured to be actuated by the auxiliary piston via the reaction disc;
   a control rod connected to a brake pedal;
   a plunger piston configured to extend through the first auxiliary piston and to press on a portion of the reaction disc by being connected to the control rod; and
   a detector configured to detect movement of the control rod in order to actuate the electric motor.

2. The electrohydraulic servo brake as claimed in claim 1, wherein:
   the second auxiliary piston defines a crown having a shoulder configured to be engaged on the central piston; and
   during forward movement of the central piston, the second auxiliary piston is configured (i) to be driven in a direction of the pushing action of the push rod, and (ii) at the same time to move forward with respect to the central piston by the spring being compressed.

3. The electrohydraulic servo brake as claimed in claim 1, further comprising:
   a stop configured to limit forward movement of the second auxiliary piston, which is fitted on the end of the push rod, relative to the push rod.

4. The electrohydraulic servo brake as claimed in claim 1, wherein the end of the push rod carries a cylindrical portion which is surrounded by the pressure spring and which forms a stop which limits forward movement of the second auxiliary piston with respect to the central piston which is securely connected to the push rod.

5. The electrohydraulic servo brake as claimed in claim 1, wherein:
- the pressure spring is tared for a desired pressure in the main brake cylinder; and
- the desired pressure is fixed at 130 bar.

* * * * *